Patented May 10, 1927.

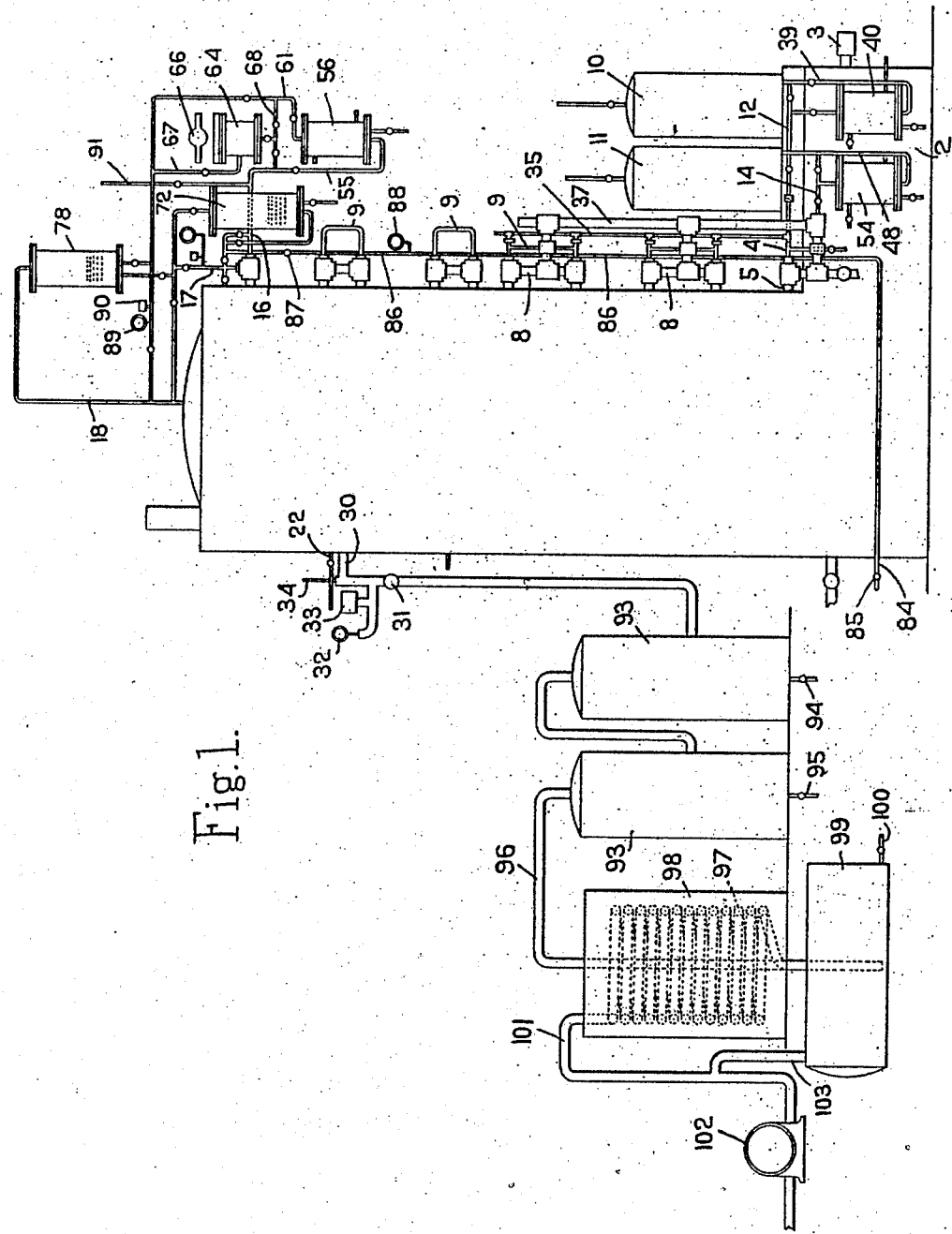

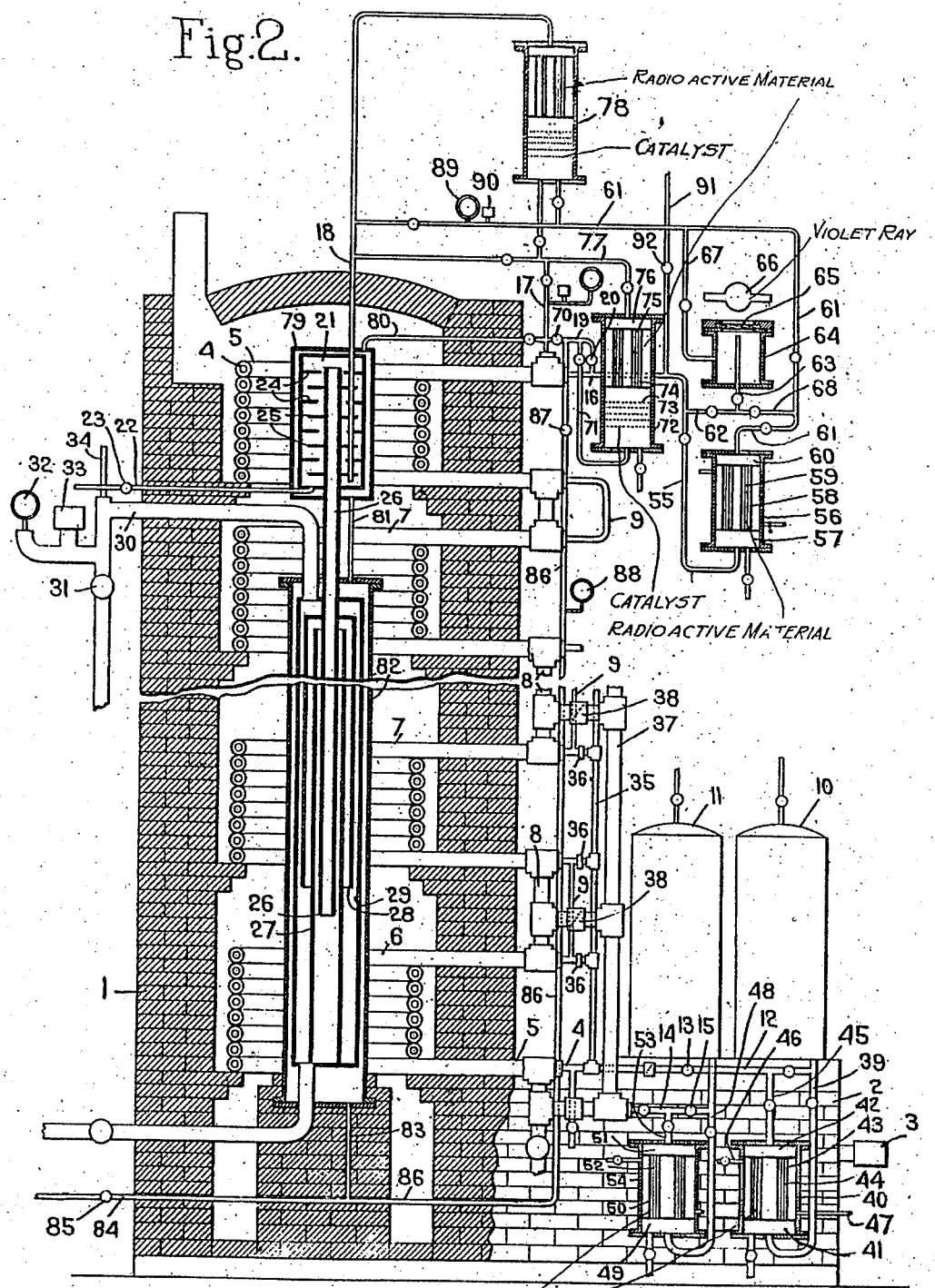

1,627,938

UNITED STATES PATENT OFFICE.

STEPHEN L. TINGLEY, OF NITRO, WEST VIRGINIA.

OIL DISTILLATION AND CRACKING.

Application filed December 28, 1923. Serial No. 683,163.

This invention relates to improvements in oil cracking and distillation apparatus and the general object thereof is to provide a more effective apparatus for the cracking and distillation of hydrocarbon oils which will enable the complex hydrocarbon molecules to be broken up at lower temperatures than are usually required in oil cracking and distillation apparatus and also which will maintain a more even and perfect production of a desired distillation product.

The invention comprises certain improvements upon the apparatus disclosed in my prior application Serial Number 668,229 filed October 12, 1923, in which a jacketed coil is located in and extends preferably longitudinally of the furnace, oil being supplied to the central coil or conduit and steam to the jacket of the coil. In this construction the oil and steam are vaporized during their passage through the furnace and the steam which surrounds the oil conduit is superheated to a very high temperature. The superheated steam which surrounds the oil conduit heats the oil vapor in the conduit to substantially the same high temperature which is sufficient to crack the more complex molecules of the hydrocarbon. The oil and a regulated portion of the steam are then discharged into a mixing chamber from which they are carried into a fixation chamber and retained in said fixation chamber a sufficient time to permanently fix the product which is then carried to a suitable condensing and storage apparatus.

One of the objects of the present invention is to provide means for subjecting the oil and water, before the same enter the coil and jacket, respectively to the influence of a radioactive material to facilitate the operation of distillation and cracking.

A further object of the invention is to provide means for subjecting the highly heated oil vapor to radioactivity either by subjecting the oil vapor to emanations from a radioactive substance or to the action of the ultra-voilet rays or both prior to the introduction of the oil vapor into the mixing chamber.

A further object of the invention is to provide means for subjecting the superheated steam to the action of a catalyst, or a substance acting in the nature of a flux, prior to its introduction into the mixing chamber in order to assist in breaking up the molecules of the superheated steam into their constituent elements hydrogen and oxygen.

A further object of the invention is to provide means by which a mixture of superheated steam and highly heated hydrocarbon vapor, in which more or less of the complex molecules of the hydrocarbon have been cracked, may be subjected, while in such mixed state, to radioactivity either by emanations from a radioactive substance or to the action of the ultra-violet ray, or both, prior to the entry into the mixing chamber.

A further object of the invention is to provide means for subjecting the mixed steam and hydrocarbon vapors to the action of a catalyst, preferably prior to the entry into the mixing chamber further to facilitate the necessary chemical reactions required to crack the more resistant complex hydrocarbon molecules and to cause such chemical reaction between the elements of the dissociated molecules as will produce a desired product.

A further object of the invention is to provide a steam jacket surrounding the mixing chamber and also a steam jacket surrounding the fixation chamber which will protect the walls of the mixing and fixation chambers respectively from direct contact with the flames or heat of the furnace thereby preventing carbonization upon the inner walls of the mixing and fixation chambers.

A further object of the invention is to provide means for controlling the fluctuations of the liquid level of the oil and preferably also of the water in the conduits which fluctuation is likely to be caused by generation of vapor below the surface of the oil which will force the column of liquid upwardly.

Other objects and features of the invention will more fully appear from the following description and the accompanying drawings and will be particularly pointed out in the claims.

In the drawings:

Fig. 1 is a side elevation of the preferred form of apparatus embodying the invention;

Fig. 2 is a view, mainly in vertical section and centrally broken away, of a furnace containing the jacketed coils for the hydrocarbon and its vapors, the water and its superheated steam, and illustrating also the means for subjecting the oil and water respectively to emanations preferably a beta ray from a radioactive substance such as uranium oxide, and also illustrating the preferred forms of apparatus for subjecting the highly heated hydrocarbon vapors and the superheated steam to radioactivity either in the form of emanations preferably a beta ray from a radioactive substance, or to the action of the ultra-violet ray, or both, or to the action of a substance which acts as a catalyst and various means by which the hydrocarbon vapors or the superheated steam may be selectively treated either singly or in mixed condition in one or more of such apparatus.

The apparatus illustrated in the drawings may be and preferably is similar to that disclosed in my prior application aforesaid and comprises a preferably cylindrical vertical furnace 1, of brick with a lining of fire brick or other suitable refractory material, provided with a fire-box extension 2, preferably of the "Dutch oven" type into which a gas or oil burner 3 extends. A pipe 4 for the oil leads into the furnace and is surrounded by an outer concentric pipe 5 which forms a jacket for the oil pipe. The inner and outer pipes are formed into a cylindrical coil 6 which may be of any desired diameter and contain any desired number of turns.

As illustrated herein the coil 6 is formed in a series of superposed sections 7 which, for convenience in construction, are separately supported upon a series of projections or ledges projecting inwardly from the wall of the furnace. The sections of the jacket pipe are joined by suitable connections 8 which may extend outside of the furnace wall as illustrated or may be housed in a recess in the wall as desired. The sections of the oil pipe likewise are joined by connections 9 in a similar manner to the connections of the sections of the jacket.

Any suitable means may be provided for supplying oil to the inner pipe or coil and water to the outer pipe or jacket. As illustrated herein tanks 10 and 11 are mounted above or upon the fire-box, the tank 10 being connected with the oil pipe 4 by a pipe 12 provided with a suitable regulating valve 13 to control the quantity of oil supplied. A suitable branch pipe is provided to permit the oil to be passed through an apparatus in which the oil is subjected to radioactivity as will hereinafter be more fully described.

The tank 11 is connected to the outer or jacket coil 5 by a pipe 14 equipped with a regulating valve 15 by which the quantity of water admitted may be regulated and through which the water may be passed directly to said jacket. A suitable branch pipe is also provided through which the water may be carried to a suitable apparatus for subjecting the same to radioactivity before its introduction into the jacket 5 as will hereinafter more fully appear.

The oil pipe 4 and the jacket pipe 5 are connected at the top of the upper section of the coil respectively to branches 16 and 17 which, by means of suitable connections, are united to a pipe 18 which extends downwardly through the top of the furnace into a mixing chamber and terminates near the bottom of the mixing chamber, suitable regulating valves being provided so that a predetermined amount of oil vapor and superheated steam may be introduced into the mixing chamber. A by-pass 19 connects the branch 17, though which the superheated steam is delivered, to the branch 16 of the oil pipe and is provided with a valve 20 by means of which superheated steam may be passed through the inner or oil pipe in a downward direction for the purpose of cleaning the oil pipe.

The mixture of highly heated hydrocarbon vapor and superheated steam passes from the pipe 18 heretofore described into the bottom portion of a mixing chamber 21 which is preferably located in the upper part of the furnace and concentrically with the uppermost coil. A drain pipe 22, communicating with the bottom portion of the mixing chamber and having a suitable valve 23, provides means by which any residue, which collects in the mixing chamber, may be removed.

The mixing chamber desirably has a series of annular baffles 24 which project inwardly from the wall thereof and overlap intermediate annular baffles 25 which are supported upon an outlet pipe 26 which extends from the upper portion of the mixing chamber downwardly through the bottom thereof and delivers the gases from the mixing chamber to the fixation chamber. The outer and inner sets of baffles are in staggered relation and serve to force the gaseous products, which are delivered to the mixing chamber, to travel in a circuitous route from the bottom to the top of the mixing chamber, thereby insuring thorough mixing thereof.

The gaseous products which pass from the mixing chamber through the pipe 26 are delivered to the lower portion of a preferably cylindrical fixation chamber which desirably is located concentrically of the furnace and coil and which is so designed as to cause the gaseous products to circulate alternately upwardly and downwardly in thin sheets until the finally pass upwardly in a thin sheet in intimate contact with the outer wall of the fixation chamber which is highly heated. This is accomplished by providing a series of concentrically arranged partitions having heads providing closures respectively at the lower and upper ends of the fixation chamber. As illustrated herein the pipe 26, through which the gaseous products are delivered from the mixing chamber to the fixation chamber, extends downwardly through the top of the mixing chamber nearly to the bottom of the fixation chamber and the vapors, which are delivered by this pipe, are caused to ascend through an annular space between the pipe 26 and a concentric inner partition 27 which extends upwardly nearly to the top of the chamber; the vapors then pass downwardly through the annular space between the inner partition 27 and a concentric outer partition 28 nearly to the bottom of the fixation chamber, thence upwardly through the annular space between the outer partition 28 and the outer wall 29 of the fixation chamber, finally leaving the top of the fixation chamber through a pipe 30 which extends through the furnace wall and communicates with a conduit which delivers the fixed gaseous products to suitable condensing apparatus as will be hereinafter more fully described.

The rate of discharge of the gaseous product from the fixation chamber is regulated by a valve 31 in the conduit leading to the condensing apparatus and the pressure in the fixation chamber indicated by a gauge 32. Desirably a pop safety valve 33, or other suitable safety device, may be attached to the pipe 30, adjacent to the gauge 32. A pyrometer 34, extending into the pipe 30 in close proximity to the furnace wall, serves to indicate the temperature of the gaseous product leading to the fixation chamber. Thus the operator, by observation of the pressure and temperature of the fixation chamber and suitable regulation of the amount of material supplied to the coils and the delivery of the gaseous product from the chamber, is enabled to maintain the proper condition within the apparatus to produce the desired product.

The apparatus above described may be and desirably is like that disclosed in my prior application aforesaid.

One of the objects of the invention, as before stated, is to provide equalizing means for controlling the fluctuations of the liquid level respectively in the oil pipe and in its jacket. This is accomplished by connecting a header pipe 35 to certain or all of the connections which unite the sections of the oil pipe and providing check valves 36 intermediate of the header and such connections. The function of said header and check valve arrangement is to prevent the sudden rising of the liquid level in the oil pipe due to the foaming of the oil or to the formation of a cushion of steam from the water content of the oil below the surface of the oil.

By employing a header in the manner described the oil which is forced upwardly by either of these causes will enter the header by passing the check valves and be returned to the bottom of the coil. Likewise a header 37 communicates with certain or all of the connections which unite the sections of the jackets for the coil and are provided with check valves 38, this construction likewise functioning to prevent the sudden rising of the water level in the jacket by reason of the formation of a cushion of steam below the surface of the water which would tend to force the water upwardly, in which case the water thus forced upwardly will enter the header 37 by passing the check valves 38 and be returned to the bottom of the jacket.

These headers may be connected to as many of the connections for the sections of the oil and water pipe as may be desired to control the fluctuation of the liquid level of the oil and water respectively in the coil and jacket.

Another object of the invention is to provide means by which the oil or the water or both may be subjected to radioactivity before entering the coil and jacket. The purpose of thus subjecting the oil to radioactivity is to place the hydrocarbon molecules into an activated condition, thus making dissociation thereof into lighter and more simple molecules more easily accomplished and with less expenditure of heat and energy. The purpose of subjecting the water to radioactivity is to place the water in an activated condition by means of which the conversion of water into steam and its subsequent dissociation into its constituent elements, hydrogen and oxygen, may be accomplished more readily and with a less expenditure of heat.

In the particular apparatus disclosed herein a branch pipe 39 extends downwardly from the oil supply pipe 12 and communicates with an activating apparatus which preferably comprises a chamber having a cylindrical shell 40 and provided with headers 41 and 42 connected by a series of tubes 43 similar to the tubes of a water tube boiler and within each of which tubes is arranged a glass or quartz tube 44 containing a radioactive substance, such as uranium oxide, or within which tubes are arranged rods of radioactive material. The branch pipe 39 desirably leads to the header 41 and the oil flows from this header through the tubes 43 in close proximity to the radio-active material and are delivered from the header 42 through a pipe 45 which communicates with the oil supply pipe 12.

Suitable valves are provided in the oil pipe 12 and its branch 39 to enable the oil either to be passed directly into the coil or through the activating apparatus described. Desirably the chamber enclosed within the wall 40 of the activating apparatus is supplied with steam through a suitable inlet pipe 46 and delivered therefrom through an outlet pipe 47. This steam may be supplied in any suitable manner as by connections to the pipe from which the surplus superheated steam is delivered from the jacket, such connection not being illustrated herein.

The water supply pipe 14 likewise is provided with a branch 48 which leads to the header 49 of a similar activating apparatus having a series of tubes 50 connecting the header 49 with a header 51, the tubes 50 likewise enclosing tubes 52 containing a radioactive material or bars of radioactive material, the water being delivered from the upper header 51 through a pipe 53 to the supply pipe 14 for the jacket. The chamber 54 which encloses this activating apparatus may, like the chamber which encloses the activating apparatus for the oil, be supplied with steam for heating the water before it enters the water jacket 5 of the coil.

By reason of the activation of the oil and water before they respectively enter the coil and its jacket the oil and water are prepared to be more readily vaporized and dissociated by the heat of the furnace to which they are subjected during the passage through the furnace and the temperatures required for vaporization and molecular dissociation materially decreased.

A further important object of the invention is to provide means for subjecting the hydrocarbon vapors and the superheated steam respectively and selectively, either singly or in mixed condition, to radioactivity and to other means which will further aid in molecular dissociation and the recombination of the elements produced by such dissociation to produce a desired product.

In the apparatus illustrated herein the hydrocarbon vapors, which leave the upper end of the coil by the pipe 16, are led by a pipe 55 to the bottom of an activating apparatus 56 which preferably is identical in construction with that provided for subjecting the oil to radioactivity and comprises a header 57 into which the hydrocarbon vapor is introduced and from which header the vapors pass through tubes 58 enclosing bars or tubes 59 containing radioactive material such as uranium oxide into a header 60 from which they may be conducted through a pipe 61 to the pipe 18 leading to the mixing chamber. The function of this activating apparatus is to place the hydrocarbon vapors in an activated condition making dissociation into simpler compounds more complete and capable of accomplishment with less expenditure of heat energy.

Desirably means are also provided by which the hydrocarbon vapors may be subjected alternatively to the action of the ultra-violet ray, or by means of which they may be subjected successively to emanations from a radioactive substance and to the ultra-violet ray. This is accomplished in the present invention by providing a branch pipe 62 leading from the pipe 55 to a vertical pipe 63 which extends nearly to the top of a chamber 64 and are discharged in such a manner as to spread over the under surface of a glass window 65 where they are exposed to the action of the ultra-violet ray projected from a violet ray tube 66 which is superposed over the window 65. The vapors are delivered from the chamber 64 through an outlet pipe 67 to the pipe 61 which leads to the mixing chamber.

Where it is desired first to subject the hydrocarbon vapors to the action of emanations from a radioactive material and thereafter to the action of the ultra-violet ray, a branch pipe 68 may be provided to connect the pipe 61 to the pipe 63, the various pipes through which the hydrocarbon vapors are conducted being, of course, supplied with suitable valves as indicated to control the passage of the hydrocarbon in the desired manner as will be readily understood by those skilled in the art.

Means are also preferably provided to enable superheated steam to be introduced into the conduit 16 for the highly heated hydrocarbon vapors so that a mixture of hydrocarbon vapor and steam may be subjected to the emanations from a radioactive substance, or to the ultra-violet ray, or both. This is conveniently accomplished by utilizing the by-pass 19 connecting the pipe 17, through which the superheated steam is discharged from the jacket, with the pipe 16, through which the hydrocarbon vapors are discharged from the coil and providing this by-pass with a suitable valve 70 through which a regulated amount of steam may be supplied to the pipe 16, or which may be operated to prevent steam from entering the pipe 16.

By reason of the construction above described, therefore, means are provided by which the hydrocarbon vapors alone, or the hydrocarbon vapors mixed with superheated steam, may be selectively subjected to emanations from a radioactive substance or to the action of the ultra-violet ray, or successively to both. Means are, therefore, provided for securing a proper activation of the vapors or gases as may be most advantageous to the required dissociation of the molecules and the chemical reactions necessary to produce the desired product from hydrocarbon oils of different characters and qualities.

A further object of the invention is to provide means for activating the superheated steam and facilitating the dissociation of it into its constituent elements, hydrogen and oxygen. This is accomplished in the present invention by passing the superheated steam through an apparatus having means to produce an action in the nature of a catalyst upon the superheated steam before it is introduced into the pipe 18 leading to the mixing chamber.

It has been found that where steam is superheated to a high temperature the presence of certain materials, such as, nickel gauze preferably in the form of a screen in a conduit, through which the superheated steam is conducted, will facilitate the breaking up of the steam into its constituent elements particularly where the dissociated elements are thereafter immediately associated with other chemical elements or compositions, such as, unstable hydrocarbon vapors, with which the hydrogen and oxygen have a strong affinity. For this reason the material which promotes this action is referred to as acting in the nature of a catalyst.

As illustrated herein a branch pipe 71 leads from the pipe 19 to the lower end of a chamber 72 which will be termed, for the purposes of the present disclosure, as a combined catalytic and activating chamber, the lower portion of which chamber is provided with a series of screens or grids 73 of nickel gauze or other suitable material adapted to have an action upon the steam in the nature of a catalyst which will facilitate the dissociation of the steam. The upper portion of the combined catalytic and activating chamber 72 is provided with a series of tubes 74 each of which encloses a tube or rod 75 containing a radioactive substance, the superheated steam or the products therefrom passing upwardly through the tubes 74 into a header 76 and after having been thus subjected to the emanations from a radioactive substance are delivered from the header 76 through a pipe 77 to the conduit 18 which leads to the mixing chamber. Another combined catalytic and activating chamber 78 desirably is also provided to receive the superheated steam which has been passed through the catalytic and activating chamber and also to receive the hydrocarbon which has been passed through the activating chamber 56 and or the chamber 64 and subjected in these chambers either to the emanations from a radioactive substance or to the ultra-violet ray or to both.

The chamber 78 may be and preferably is similar in all respects to the combined catalytic and activating chamber 72 and the superheated steam and its products, together with the hydrocarbon vapors, are subjected to the aforesaid catalytic action as well as to the emanations from a radioactive substance in their intermingled condition prior to their introduction into the mixing chamber.

A further object of the invention is to provide jackets for the mixing chamber and for the fixation chamber which are filled with superheated steam, the purpose of which is to maintain an even heat upon the ed vapors and to prevent local heating by contact with the surface which otherwise would be exposed to the direct heat of the furnace.

In the present construction the mixing chamber 21 is provided with an enclosing jacket 79 which is supplied with superheated steam through a branch pipe 80 leading from the pipe 17 through which superheated steam is delivered from the jacket. The steam from the jacket 79 of the mixing chamber desirably is delivered through a pipe 81 to a jacket 82 completely surrounding the fixation chamber. The jacket of superheated steam on the fixation chamber maintains a uniform heat of the fixation chamber throughout its entire length and which may be controlled at will, thus insuring uniform and accurate heat treatment of the vapors or gases.

The steam is conducted from the fixation chamber by a pipe 83 leading from the bottom thereof and which may be provided with a branch 84 extending through the wall of the furnace and provided with a suitable shut-off valve 85 or may be conducted through a branch 86 leading to the branch pipe 19 which communicates with the blow-off of the steam delivery pipe 17, through which branch pipe 19 the superheated steam may be introduced into the oil pipe for the purpose of blowing out the latter. The branch pipe 86 may be provided with a suitable controlling valve 87 and a pressure gauge 88 and if desirable with a pyrometer (not shown) by which the pressure and condition of the discharging superheated steam may be observed.

By suitable regulation of the valves 85 or 87 the pressure on the fixation chamber may be controlled in such a manner that the required amount of heat will be transmitted from the furnace through the steam jacket to the fixation chamber to maintain a constant and uniform temperature upon the vapors or gases which are being treated in the fixation chamber. Desirably the pipe 18, which conducts the hydrocarbon vapors or the mixture of hydrocarbon vapors and steam to the fixation chamber, is provided with a gauge 89 and with a blow-off valve 90, and in order further to insure against accident the conduit 16, which delivers the hydrocarbon vapors from the coil, is provided with a branch pipe 91 having a relief valve 92 to discharge the vapor in event of excessive pressure.

The fixed gases which leave the fixation chamber through the pipe 30 desirably are conducted to the first of a series of two or more expansion tanks 93 in which they are cooled more or less by expansion. Any liquid which may be condensed or produced by such expansion is collected in the tank and can be withdrawn through valve-controlled outlet conduits 94 and 95. These tanks may be arranged either in series or in parallel and any desired number of tanks may be employed. The gases are conducted from the last expansion tank by a conduit 96 to the bottom of a coil 97 which is surrounded by a water jacket 98. In this coil the final liquid constituents of the gases are condensed and delivered to a catch tank 99 from which they may be removed through a valve-controlled conduit 100. The cooled gases leave the top of the coil through a pipe 101 and pass through a meter 102 enroute to a gas holder or other suitable apparatus for storing or utilizing the gas. Any dissolved gas which may be carried down into the catch tank 99 by the liquid which is condensed in the coil 97 may be permitted to enter the main gas pipe 101 through a branch pipe 103 leading from the upper portion of the catch tank 99 to the pipe 101.

Having thus described the invention, what is claimed as new, and desired to be secured by Letters Patent, is:

1. An oil cracking and distillation apparatus comprising a furnace, a jacketed coil within said furnace formed in a series of superposed substantially horizontal sections, means respectively for supplying oil and water to the lower end of said coil and jacket, a header communicating with said oil-supplying means and having check valve control connection with said coil intermediate of its sections acting to control the fluctuations of the liquid level of the oil in said coil.

2. An oil cracking and distillation apparatus comprising a furnace, a jacketed coil within said furnace formed in a series of superposed substantially horizontal sections, means respectively for supplying oil and water to the lower end of said coil and jacket, a header communicating with said water-supplying means and having check valve control connection with said coil jacket intermediate of the coil sections acting to control the fluctuations of the liquid level of the oil in said coil.

3. An oil cracking and distillation apparatus comprising a furnace, a jacketed coil within said furnace formed in a series of superposed substantially horizontal sections, means respectively for supplying oil and water to the lower end of said coil and jacket whereby the water will be converted into superheated steam and the oil heated, vaporized and its vapor superheated at substantially the same progressively increasing temperature as that of the steam and cracked by the heat of the furnace, a jacketed mixing chamber within said furnace, a delivery conduit leading to said mixing chamber provided with branches connecting respectively with said coil and jacket and means for supplying steam to the jacket of said mixing chamber whereby a high temperature will be maintained within the mixing chamber, but the walls retaining said mixture protected from the direct heat of the furnace.

4. An oil cracking and distillation apparatus comprising a furnace, a jacketed coil within said furnace formed in a series of superposed substantially horizontal sections, means respectively for supplying oil and water to the lower end of said coil and jacket whereby the water will be converted into superheated steam and the oil heated, vaporized and its vapor superheated at substantially the same progressively increasing temperature as that of the steam and cracked by the heat of the furnace, a jacketed mixing chamber within said furnace, a delivery conduit leading to said mixing chamber provided with branches connecting respectively with said coil and jacket and means for supplying superheated steam from the coil jacket to the mixing chamber jacket whereby a high temperature will be maintained within the mixing chamber, but the walls retaining said mixture protected from the direct heat of the furnace.

5. An oil cracking and distillation apparatus comprising a furnace, a jacketed coil within said furnace formed in a series of superposed substantially horizontal sections, means respectively for supplying oil and water to the lower end of said coil and jacket whereby the water will be converted into superheated steam and the oil heated, vaporized and its vapor superheated at substantially the same progressively increasing temperature as that of the steam and cracked by the heat of the furnace, a jacketed mixing chamber within said furnace, means for supplying superheated steam to the jacket of said mixing chamber, a delivery conduit leading to said mixing chamber provided with branches connecting respectively with said coil and jacket, a jacketed fixation chamber within said furnace communicating with said mixing chamber and means for supplying superheated steam to the jacket of said fixation chamber.

6. An oil cracking and distillation apparatus comprising a furnace, a jacketed coil within said furnace formed in a series of superposed substantially horizontal sections, means respectively for supplying oil and water to the lower end of said coil and jacket whereby the water will be converted into superheated steam and the oil progressively heated, vaporized and its vapor superheated at substantially the same progressively increasing temperature as that of the steam and cracked by the heat of the furnace, a jacketed mixing chamber within said furnace, means for supplying superheated steam from the jacket of the coil to the jacket of the mixing chamber, a delivery conduit leading to said mixing chamber provided with branches connecting respectively with said coil and jacket, a jacketed fixation chamber within said furnace communicating with said mixing chamber and means for supplying superheated steam to the jacket of said fixation chamber from the jacket of said mixing chamber whereby substantially uniform progressive heating of the oil vapor and the steam envelope which surrounds it will be insured.

7. An oil cracking and distillation apparatus comprising a furnace, a jacketed coil within said furnace formed in a series of superposed substantially horizontal sections, means respectively for supplying oil and water to the lower end of said coil and jacket whereby the water will be converted into superheated steam and the oil progressively heated, vaporized and its vapor superheated at substantially the same progressively increasing temperature as that of the steam and cracked by the heat of the furnace, a jacketed mixing chamber within said furnace, means for supplying superheated steam from the jacket of the coil to the jacket of the mixing chamber, a delivery conduit leading to said mixing chamber provided with branches connecting respectively with said coil and jacket, a jacketed fixation chamber within said furnace communicating with said mixing chamber and means for supplying superheated steam to the jacket of said fixation chamber from the jacket of said mixing chamber and means for regulating the supply of steam to the jackets of said mixing chamber and fixation chamber.

8. An oil cracking and distillation apparatus comprising a furnace, a jacketed coil within said furnace formed in a series of superposed substantially horizontal sections, means respectively for supplying oil and water to the lower end of said coil and jacket whereby the water will be converted into superheated steam and the oil progressively heated, vaporized and its vapor superheated at substantially the same progressively increasing temperature as that of the steam and cracked by the heat of the furnace, a jacketed mixing chamber within said furnace, means for supplying superheated steam from the jacket of the coil to the jacket of the mixing chamber, a delivery conduit leading to said mixing chamber provided with branches connecting respectively with said coil and jacket, a jacketed fixation chamber within said furnace communicating with said mixing chamber, means for supplying superheated steam to the jacket of said fixation chamber from the jacket of said mixing chamber, means for regulating the supply of steam to the jackets of said mixing chamber and fixation chamber and means for regulating the pressure of the superheated steam in the jackets of said mixing and fixation chambers whereby the temperatures maintained in the mixing and fixation chambers can be accurately controlled.

9. An oil cracking and distillation apparatus comprising a furnace, a jacketed coil within said furnace formed in a series of superposed substantially horizontal sections, means respectively for supplying oil and water to the lower end of said coil and jacket whereby the water will be converted into superheated steam and the oil heated, vaporized and its vapor superheated at substantially the same progressively increasing temperature as that of the steam and cracked by the heat of the furnace, a jacketed mixing chamber within said furnace, means for supplying superheated steam from the jacket of the coil to the jacket of the mixing chamber, a delivery conduit leading to said mixing chamber provided with branches connecting respectively with said coil and jacket, a jacketed fixation chamber within said furnace communicating with said mixing chamber, means for supplying superheated steam to the jacket of said fixation chamber from the jacket of said mixing chamber, means for regulating the supply of steam to the jackets of said mixing chamber and fixation chamber and a conduit, having a regulating valve, leading from the jacket of said fixation chamber to one of the branches of the delivery conduit which communicates with said mixing chamber.

10. An oil cracking and distillation apparatus comprising a furnace, a jacketed coil within said furnace formed in a series of superposed substantially horizontal sections, means respectively for supplying oil and water to the lower end of said coil and jacket, a jacketed mixing chamber concentric with said coil and a jacketed fixation chamber located beneath and communicating with said mixing chamber, a delivery conduit leading to said mixing chamber having branches communicating respectively with said coil and its jacket to introduce a mixture of oil vapor and superheated steam into said mixing chamber and means for supplying superheated steam from the jacket of said coils progressively to the jacket of the mixing chamber and the jacket of the fixation chamber.

11. An oil cracking and distillation apparatus comprising a furnace, a jacketed coil within said furnace formed in a series of superposed substantially horizontal sections, means respectively for supplying oil and water to the lower end of said coil and jacket, a jacketed mixing chamber concentric with said coil and a jacketed fixation chamber located beneath and communicating with said mixing chamber, a delivery conduit leading to said mixing chamber having branches communicating respectively with said coil and its jacket to introduce a mixture of oil vapor and superheated steam into said mixing chamber, means for supplying superheated steam from the jacket of said coils progressively to the jacket of the mixing chamber and the jacket of the fixation chamber and means for delivering superheated steam from the jacket of the fixation chamber to the branch of the delivery conduit which leads to the mixing chamber.

12. An oil cracking and distillation apparatus comprising a furnace, a jacketed coil within said furnace formed in a series of superposed substantially horizontal sections, means respectively for supplying oil and water to the lower end of said coil and jacket, a jacketed mixing chamber and a jacketed fixation chamber communicating therewith and located in the furnace concentrically within said coil, an inlet conduit leading to said mixing chamber having branches connected respectively to said coil and its jacket to introduce a mixture of oil vapor and superheated steam into said mixing chamber and means for supplying superheated steam from said coil jacket progressively to the jacket of said mixing chamber and the jacket of said fixation chamber.

13. An oil cracking and distillation apparatus comprising a furnace, a conduit for the oil within said furnace, a fixation chamber, means for supplying oil to said conduit, means for subjecting the oil before entering said conduit to emanations from a radioactive substance and means for conducting the highly heated oil vapors from said conduit to said fixation chamber.

14. An oil cracking and distillation apparatus comprising a furnace, a conduit for the oil within said furnace, a fixation chamber, means for supplying oil to said conduit, means for preliminary heating the oil and subjecting the same to emanations from a radioactive substance before entering said coil.

15. An oil cracking and distillation apparatus comprising a furnace, a conduit for the oil within said furnace, a fixation chamber, means for supplying oil to said conduit, means for preliminary heating the oil and subjecting the same to emanations from a radioactive substance before entering said coil and means for subjecting the oil vapor delivered from said conduit to emanations from a radioactive substance before entering the fixation chamber.

16. An oil cracking and distillation apparatus comprising a furnace, a conduit for the oil within said furnace, a fixation chamber, means for supplying oil to said conduit, means for conducting the highly heated oil vapor from said conduit to said fixation chamber and means for subjecting the oil vapor to emanations from a radioactive substance before entering the fixation chamber.

17. An oil cracking and distillation apparatus comprising a furnace, a conduit for the oil within said furnace, a fixation chamber, means for supplying oil to said conduit, means for conducting the highly heated oil vapor from said conduit to said fixation chamber and means for subjecting the oil vapor to the action of the ultra-violet ray before entering the fixation chamber.

18. An oil cracking and distillation apparatus comprising a furnace, a conduit for the oil within said furnace, a fixation chamber, means for supplying oil to said conduit, means for conducting the highly heated oil vapor from said conduit to said fixation chamber and means for progressively subjecting the oil vapor to the emanations from a radioactive substance and to the action of the ultra-violet ray before entering the fixation chamber.

19. An oil cracking and distillation apparatus comprising a furnace, a jacketed oil conduit within said furnace, means for supplying oil and water respectively to said oil conduit and its jacket at the same end, whereby oil vapor and superheated steam of substantially the same temperature will be progressively produced, a delivery conduit having branches communicating respectively with said conduit and its jacket to receive the highly heated oil vapor and superheated steam and means for subjecting the mixture of oil vapor and steam to emanations from a radioactive substance.

20. An oil cracking and distillation apparatus comprising a furnace, a jacketed oil conduit within said furnace, means for supplying oil and water respectively to said oil conduit and its jacket at the same end whereby oil vapor and superheated steam of substantially the same temperature will be progressively produced, a delivery conduit having branches communicating respectively with said conduit and its jacket to receive the highly heated oil vapor and superheated steam and means for subjecting said mixture of oil vapor and superheated steam to the action of the ultra-violet ray.

21. An oil cracking and distillation apparatus comprising a furnace, a jacketed oil conduit within said furnace, means for supplying oil and water respectively to said oil conduit and its jacket at the same end whereby oil vapor and superheated steam of substantially the same temperature will be progressively produced, a delivery conduit having branches communicating respectively with said conduit and its jacket to receive the highly heated oil vapor and superheated steam and means for subjecting said mixture of oil vapor and superheated steam either to the emanations from a radioactive substance or to the action of ultra-violet ray or to both and a mixing chamber within said furnace communicating with said delivery conduit.

22. An oil cracking and distillation apparatus comprising means for vaporizing the oil and highly heating the vapor thereof, means for producing and superheating steam to substantially the same temperature as that of the oil vapor, means for subjecting a portion of the superheated steam thus generated to emanations from a radioactive substance and means for mixing the activated steam with the oil vapor.

23. An oil cracking and distillation apparatus comprising means for vaporizing the oil and highly heating the vapor thereof, means for producing and superheating steam to substantially the same temperature as that of the oil vapor, a mixing chamber, means for introducing a mixture of highly heated oil vapor and a regulated amount of the superheated steam into said mixing chamber and means for subjecting another regulated amount of the steam to emanations from a radioactive substance and adding the steam thus activated to said mixture in advance of the mixing chamber.

24. An oil cracking and distillation apparatus comprising means for vaporizing the oil and highly heating the vapor thereof, means for producing and superheating steam to substantially the same temperature as that of the oil vapor, means for mixing a portion of the superheated steam with said oil vapor, means for subjecting said mixture to emanations from a radioactive substance, means for subjecting another portion of the steam to the emanations from a radioactive substance and thereafter introducing the steam thus activated into said mixture.

25. An oil cracking and distillation apparatus comprising means for vaporizing the oil and highly heating the vapor thereof, means for producing and superheating steam to substantially the same temperature as that of the oil vapor, means for mixing a portion of the superheated steam with said oil vapor, means for subjecting said mixture to the action of the ultra-violet ray, means for subjecting another portion of the steam to emanations from a radioactive substance and thereafter introducing the steam thus activated into said mixture.

26. An oil cracking and distillation apparatus comprising means for vaporizing the oil and highly heating the vapor thereof, means for producing steam and superheating the same to substantially the same temperature as that of the oil vapor, means for mixing a portion thereof with said oil vapor, means for subjecting the oil before vaporization to emanations from a radioactive substance and means for subjecting the mixture of oil vapors and superheated steam to emanations from a radioactive substance.

27. An oil cracking and distillation apparatus comprising means for vaporizing the oil and highly heating the vapor thereof, means for producing steam and superheating the same to substantially the same temperature of the oil vapor and means for mixing a portion thereof with said oil vapor and means for subjecting the water before vaporization into steam to emanations from a radioactive substance.

28. An oil cracking and distillation apparatus comprising means for vaporizing the oil and highly heating the vapor thereof, means for producing steam and superheating the same to substantially the same temperature as that of the oil vapor, means for mixing a portion thereof with said oil vapor, means for respectively subjecting the water and oil before vaporization to emanations from a radioactive substance and means for subjecting the mixture of oil vapor and superheated steam to emanations from a radioactive substance.

29. An oil cracking and distillation apparatus comprising means for vaporizing the oil and highly heating the vapor thereof, means for producing steam and superheating the same to substantially the same temperature as that of the oil vapor, means for mixing a portion thereof with said oil vapor, means for respectively subjecting the water and oil before vaporization to emanations from a radioactive substance and means for subjecting the mixture of oil vapor and superheated steam selectively to emanations from a radioactive substance or to the action of the ultra-violet ray or both.

30. An oil cracking and distillation apparatus comprising means for vaporizing the oil and highly heating the vapor thereof, means for producing and superheating steam to substantially the same temperature as that of the oil vapor, means for subjecting a portion of the superheated stream to the influence of a substance capable of catalytic-like action upon said superheated steam to facilitate dissociation thereof, means for subjecting the steam and the elements dissociated therefrom and intermingled therewith to the activating influence of emanations from a radioactive substance and means for mixing the activated superheated steam and said dissociated elements with the highly heated hydrocarbon vapors.

31. An oil cracking and distillation apparatus comprising means for vaporizing the oil and highly heating the vapor thereof, means for producing and superheating steam to substantially the same temperature as that of the oil vapor, means for subjecting a portion of the superheated steam to the influence of a substance capable of catalytic-like action upon said superheated steam to facilitate dissociation thereof, means for subjecting the highly heated hydrocarbon vapors to the emanations of a radioactive substance and means for mixing the activated hydrocarbon vapors with the superheated steam and its dissociated elements.

32. An oil cracking and distillation apparatus comprising means for vaporizing the oil and highly heating the vapor thereof, means for producing and superheating steam to substantially the same temperature as that of the oil vapor, means for subjecting a portion of the superheated steam to the influence of a substance capable of catalytic-like action upon said superheated steam to facilitate dissociation thereof, means for subjecting the highly heated hydrocarbon vapors to the emanations of a radioactive substance and also to the activating influence of the ultra-violet ray and means for mixing the activated hydrocarbon vapors with the superheated steam and its dissociated elements.

33. An oil cracking and distillation apparatus comprising means for vaporizing the oil and highly heating the vapor thereof, means for producing and superheating steam to substantially the same temperature as that of the oil vapor, means for subjecting a portion of the superheated steam to the influence of a substance capable of catalytic-like action upon said superheated steam to facilitate dissociation thereof, means for subjecting the steam and the elements dissociated therefrom and intermingled therewith to the activating influence of emanations from a radioactive substance, means for mixing another portion of the superheated steam with said highly heated hydrogen vapors, means for subjecting said mixture selectively to emanations from a radioactive substance or to the ultra-violet ray or to both and means for mixing the activated mixture with the activated superheated steam and its dissociated elements.

In testimony whereof, I have signed my name to this specification.

STEPHEN L. TINGLEY.